United States Patent
Eriksson et al.

(10) Patent No.: US 11,110,910 B2
(45) Date of Patent: *Sep. 7, 2021

(54) METHOD AND SYSTEM FOR STARTING AN INTERNAL COMBUSTION ENGINE OF A HYBRID VEHICLE

(71) Applicant: Volvo Car Corporation, Gothenburg (SE)

(72) Inventors: Andreas Eriksson, Mölndal (SE); Andreas Jansson, Gothenburg (SE); Jonas Forssell, Torslanda (SE); Mathias Gylling, Torslanda (SE); Mats Bohman, Torslanda (SE); Mattias Kroon, Torslanda (SE)

(73) Assignee: Volvo Car Corporation, Gothenburg (SE)

(*) Notice: Subject to any disclaimer, the term of this patent is extended or adjusted under 35 U.S.C. 154(b) by 317 days.

This patent is subject to a terminal disclaimer.

(21) Appl. No.: 16/285,334

(22) Filed: Feb. 26, 2019

(65) Prior Publication Data
US 2019/0299975 A1 Oct. 3, 2019

(30) Foreign Application Priority Data
Mar. 29, 2018 (EP) .................................... 18165051

(51) Int. Cl.
*B60W 20/40* (2016.01)
*B60K 6/48* (2007.10)
(Continued)

(52) U.S. Cl.
CPC .............. *B60W 20/40* (2013.01); *B60K 6/26* (2013.01); *B60K 6/38* (2013.01); *B60K 6/387* (2013.01);
(Continued)

(58) Field of Classification Search
CPC .... B60W 20/40; B60W 10/02; B60W 10/023; B60W 10/026; B60W 10/06;
(Continued)

(56) References Cited

U.S. PATENT DOCUMENTS

| 8,251,864 B2 * | 8/2012 | Tabata | B60K 6/445 |
|---|---|---|---|
| | | | 477/3 |
| 10,605,216 B2 * | 3/2020 | Stalfors | B60W 10/06 |
| 2012/0095635 A1 * | 4/2012 | Kanno | B60W 10/06 |
| | | | 701/22 |

FOREIGN PATENT DOCUMENTS

| DE | 102013012155 A1 | 1/2015 |
| DE | 102016202138 A1 | 8/2017 |

(Continued)

OTHER PUBLICATIONS

Sep. 28, 2018 European Search Report issue on International Application No. EP18165051.

*Primary Examiner* — Gertrude Arthur Jeanglaude
(74) *Attorney, Agent, or Firm* — Clements Bernard Walker; Christopher L. Bernard

(57) ABSTRACT

Method and system for starting an internal combustion engine of a hybrid vehicle, adapted to rotate a drive shaft providing torque via a transmission unit comprising a first clutch connecting the engine to an input shaft of a gearbox connected to a torque converter connected to a second clutch connecting the torque converter to the at least one driving wheel, where the input shaft is connected to an electric machine; the method comprising: disengaging the second clutch to a predetermined torque level such that there is a slip in the second clutch; engaging the lock-up clutch; engaging the first clutch to bring the engine to a first rotational speed; disengaging the first clutch when the engine has reached the first rotational speed; starting the
(Continued)

engine, and engaging the first clutch when the engine has started and rotates with a second rotational speed.

14 Claims, 3 Drawing Sheets

(51) Int. Cl.
    *B60K 6/26* (2007.10)
    *B60W 10/02* (2006.01)
    *B60W 10/06* (2006.01)
    *B60W 10/08* (2006.01)
    *F02N 5/04* (2006.01)
    *F16D 48/06* (2006.01)
    *B60W 10/11* (2012.01)
    *B60K 6/38* (2007.10)
    *B60K 6/387* (2007.10)
    *F02N 11/00* (2006.01)

(52) U.S. Cl.
CPC ............... *B60K 6/48* (2013.01); *B60W 10/02* (2013.01); *B60W 10/023* (2013.01); *B60W 10/026* (2013.01); *B60W 10/06* (2013.01); *B60W 10/08* (2013.01); *B60W 10/11* (2013.01); *F02N 5/04* (2013.01); *F02N 11/00* (2013.01); *F16D 48/06* (2013.01); *B60K 2006/268* (2013.01); *B60K 2006/4825* (2013.01); *B60W 2510/0283* (2013.01); *B60W 2510/0638* (2013.01); *B60W 2710/021* (2013.01); *B60W 2710/024* (2013.01); *B60W 2710/025* (2013.01); *B60W 2710/027* (2013.01); *B60W 2710/0627* (2013.01); *B60W 2710/0644* (2013.01); *B60W 2710/083* (2013.01); *B60W 2710/1011* (2013.01); *B60Y 2200/92* (2013.01)

(58) Field of Classification Search
CPC ......... B60W 10/08; B60W 10/11; B60K 6/26; B60K 6/38; B60K 6/387; B60K 6/48; B60K 2006/258; F02N 5/04; F02N 11/00; F16D 48/06
USPC .......................................................... 701/22
See application file for complete search history.

(56) References Cited

FOREIGN PATENT DOCUMENTS

| | | |
|---|---|---|
| DE | 102016203260 A1 | 8/2017 |
| FR | 2911101 A1 | 7/2008 |

\* cited by examiner

METHOD AND SYSTEM FOR STARTING AN INTERNAL COMBUSTION ENGINE OF A HYBRID VEHICLE

CROSS-REFERENCE TO RELATED APPLICATION

The present patent application/patent claims the benefit of priority of co-pending European Patent Application No. 18165051.6, filed on Mar. 29, 2018, and entitled "METHOD AND SYSTEM FOR STARTING AN INTERNAL COMBUSTION ENGINE OF A HYBRID VEHICLE, AND A HYBRID VEHICLE COMPRISING A SYSTEM FOR STARTING AN INTERNAL COMBUSTION ENGINE," the contents of which are incorporated in full by reference herein.

TECHNICAL FIELD

The present disclosure relates to a method for starting an internal combustion engine of a hybrid vehicle, where the internal combustion engine is adapted to rotate a drive shaft providing torque to at least one driving wheel of the hybrid vehicle via a transmission unit. The disclosure also relates to a system for starting an internal combustion engine of a hybrid vehicle, a hybrid vehicle comprising a system for starting an internal combustion engine, a computer program and a computer program product.

BACKGROUND ART

Hybrid vehicles using a combination of an internal combustion engine and an auxiliary drive source, such as an electric machine, are becoming more and more popular due to their efficient use of energy. The internal combustion engine can be operated intermittently to provide power to the hybrid vehicle's driveline when needed depending on the driving conditions. In low speed driving situations the hybrid vehicle may be operated by only using the auxiliary drive source and when more power is needed the internal combustion engine supplies additional power to the driveline, for example when driving at higher speeds. For hybrid vehicles of the parallel type, both the internal combustion engine and the auxiliary drive source can drive one or more driving wheels through the hybrid vehicle's transmission unit.

When starting an internal combustion engine, usually a traditional 12 V starter system with a starter motor is used. Modern hybrid vehicles however use 48 V electrical systems, or systems with other voltages, often with lithium-ion batteries. An electrical starter motor could also be used in a 48 V system for starting the internal combustion engine, but it is common to use an Integrated Starter Generator (ISG), where the electric machine is adapted to function as a starter motor for starting the internal combustion engine and as an electrical motor for propelling the vehicle, and as a generator for charging the battery when the vehicle is powered by the internal combustion engine. The used 48 V lithium-ion type of battery is however limited in available output power, which may make it difficult to start the internal combustion engine when the ISG is used to propel the vehicle, especially at higher speeds which requires relatively high power. When the electric machine is used at higher speeds or at higher accelerations, the power reserve of the electric system is relatively low. If the maximum output of the electrical system is e.g. 25 kW, a maximum of 5 kW may be reserved for starting the internal combustion engine. If the electric machine is fully loaded, the reserved power may be less, and may not suffice for starting the internal combustion engine, especially in low temperature situations.

One common solution to this problem is to use a 12 V starter motor having a conventional 12 V lead battery. Another alternative for starting an internal combustion engine is to use a flywheel for starting the internal combustion engine through using energy stored in the flywheel.

U.S. Pat. No. 6,098,584A discloses a starter apparatus for an internal combustion engine including a device for rotating a flywheel that in an impulse starting method is used for starting the engine with the rotational energy stored in the flywheel. Alternatively, a direct starting method could be used, where an integrated starter-generator is directly coupled to the engine. A changeover device switches between the direct starting method and the impulse starting method as a function of the temperature of the engine so that the impulse starting method is used at comparatively lower temperatures and the direct starting method is used at comparatively higher temperatures.

A major disadvantage with a starter apparatus of this kind is that the solution is not suitable for modern hybrid vehicles that need a very compact engine and transmission design, including both an internal combustion engine and an auxiliary drive source with the possibility to start the internal combustion engine during different driving conditions that also is suitable for cold starts in very low temperatures. There is also a risk with a starter apparatus of the above described type that hesitation occurs when switching from an electrical driving mode, where the auxiliary drive source is delivering power, to a hybrid driving mode, where also the internal combustion engine is delivering power to the hybrid vehicle.

GB 2413998 A discloses method of controlling the drive train of a hybrid vehicle, where an engine is started by an electric motor generator connected to a flywheel. The vehicle is provided with a parallel hybrid drive with a series arrangement of the engine, the motor generator and a drive gear connected to a drive axle. Controllable friction clutches are provided at the input and output sides of the motor generator respectively. In an exclusively electric mode, the flywheel is accelerated by the electric machine to build up surplus momentum, where the output clutch is controlled in a slip mode. The available power to accelerate the flywheel is dependent on the driving condition of the vehicle. Closure of the motor input side clutch then starts the engine.

In this solution, a separate flywheel driven by an inline motor generator is used to provide sufficient torque to start the engine of the vehicle. Since the components are arranged in series, the solution is not suitable for a compact packing of a hybrid engine. Another disadvantage is that an inline motor generator must be relatively large to be able to provide the required torque to start the engine. Further, by using a separate flywheel, additional weight is added to the system.

These solutions may function well most of the time, but they display some drawbacks. One is that the mass of the flywheel adds weight to the vehicle. Another drawback is that the required time to accelerate the flywheel is dependent on the available reserved power of the electrical system. If the electric machine is heavily loaded, the time to accelerate the flywheel will be relatively long. This will in turn impact the perceived driveability of the vehicle. This is especially noticeable when the vehicle is accelerating and needs additional power from the internal combustion engine to be able to deliver the requested acceleration. If the time to start the internal combustion engine is too long, the driver will notice a slow acceleration.

There is thus a need for an improved way of starting an internal combustion engine in a hybrid vehicle including both an internal combustion engine and an auxiliary drive source that prevents hesitation when starting the internal combustion engine.

SUMMARY

An object of the invention is therefore to provide an improved method for starting an internal combustion engine in a hybrid vehicle. A further object is to provide a vehicle comprising such an improved method. A further object is to provide an improved system for starting an internal combustion engine of a hybrid vehicle.

The disclosure concerns a method for starting an internal combustion engine of a hybrid vehicle, where the internal combustion engine is adapted to rotate a drive shaft providing torque to at least one driving wheel of the hybrid vehicle via a transmission unit; where the transmission unit comprises a first clutch connecting the internal combustion engine to an input shaft of a gearbox, where the input shaft is connected to a torque converter provided with a lock-up clutch, or any other appropriate clutch being arranged in parallel with the torque converter, where the torque converter is connected to a second clutch connecting the torque converter to the at least one driving wheel through a transmission, where the input shaft is connected to an electric machine, and where the first clutch is open, the method comprising the steps of; disengaging the second clutch to a predetermined torque level such that there is a slip in the second clutch; engaging the lock-up clutch; engaging the first clutch to bring the internal combustion engine to a first rotational speed; disengaging the first clutch when the internal combustion engine has reached the first rotational speed; starting the internal combustion engine by injecting fuel and igniting the fuel; and engaging the first clutch when the internal combustion engine has started and rotates with a second rotational speed. One advantage with the method described above is that an internal combustion engine can be started in an easy and quick way. Further, the method prevents hesitation when starting the internal combustion engine.

According to an embodiment of the disclosure, the method further comprises the step of delivering an additional torque to the torque converter by the electric machine before the lock-up clutch is engaged. In this way, additional angular momentum can be added to the torque converter to start the internal combustion engine, which will further enhance the start procedure.

According to an embodiment of the disclosure, the method further comprises the step of disengaging the first clutch to a torque level which corresponds to the additional torque delivered by the electric machine when the internal combustion engine has reached the first rotational speed. An advantage with this feature is that the internal combustion engine can be started even faster, since additional angular momentum is added during the start of the internal combustion engine. This will also allow the vehicle to be started in very low temperatures.

According to an embodiment of the disclosure, the first rotational speed of the internal combustion engine is ranging between 300 rpm and 500 rpm.

According to an embodiment of the disclosure, the second rotational speed of the internal combustion engine corresponds to the rotational speed of the second clutch. In this way, the rotational speed of the internal combustion engine is the same as the rotational speed of the input shaft of the gearbox, which will allow for a smooth engagement of the first clutch.

According to an embodiment of the disclosure, the torque level of the second clutch is ranging between 30 Nm and 300 Nm.

According to an embodiment of the disclosure, the method further comprises the step that the second clutch is engaged to a fully engaged state to deliver torque to the at least one driving wheel of the hybrid vehicle when the internal combustion engine has started. By fully engaging the second clutch, there will be no losses due to slippage in the second clutch.

The disclosure further concerns a system for starting an internal combustion engine of a hybrid vehicle when the hybrid vehicle is powered by an electric machine, where the system comprises an internal combustion engine, an electric machine, and a transmission unit, where the transmission unit comprises a gearbox, where the gear box comprises a torque converter provided with a lock-up clutch, a second clutch and a transmission, where the internal combustion engine is adapted to rotate a drive shaft providing torque to at least one driving wheel of the hybrid vehicle via the transmission unit, where the first clutch connects the internal combustion engine to the input shaft of the gearbox, where the input shaft is connected to the torque converter, where the torque converter is connected to the second clutch connecting the torque converter to the at least one driving wheel through the transmission, where the input shaft further is connected to the electric machine, the object of the invention is achieved in that the lock-up clutch is adapted to be engaged after the second clutch has been disengaged to a predetermined torque level such that there is a slip in the second clutch, that the internal combustion engine is adapted to be brought to a first rotational speed by the angular momentum stored in the torque converter by engaging the first clutch, and that the first clutch is adapted to be disengaged until the internal combustion engine has started and reached a second rotational speed. One advantage with the system described above is that a system is obtained, where an internal combustion engine can be started in an easy and quick way.

According to an embodiment of the disclosure, the first clutch is disengaged when the internal combustion engine is started by injecting fuel and igniting the fuel. The first clutch is engaged when the internal combustion engine has reached a second rotational speed. By disengaging the first clutch during the start of the internal combustion engine, the amount of angular momentum required to start the internal combustion engine is reduced.

The disclosure further concerns a hybrid vehicle having a system for starting an internal combustion engine, a computer program and computer program product. The computer program and computer program product may comprise program code means stored on a computer readable medium for performing all the steps of any one of the above described embodiments related to the method of the invention. Such computer program or computer program product may be implemented in an electrical control unit (ECU) in the above disclosed system of the invention.

BRIEF DESCRIPTION OF DRAWINGS

The invention will be described in greater detail in the following, with reference to the attached drawings, in which.

DESCRIPTION OF EMBODIMENTS

The embodiments of the invention with further developments described in the following are to be regarded only as examples and are in no way to limit the scope of the protection provided by the patent claims.

Figure 1:
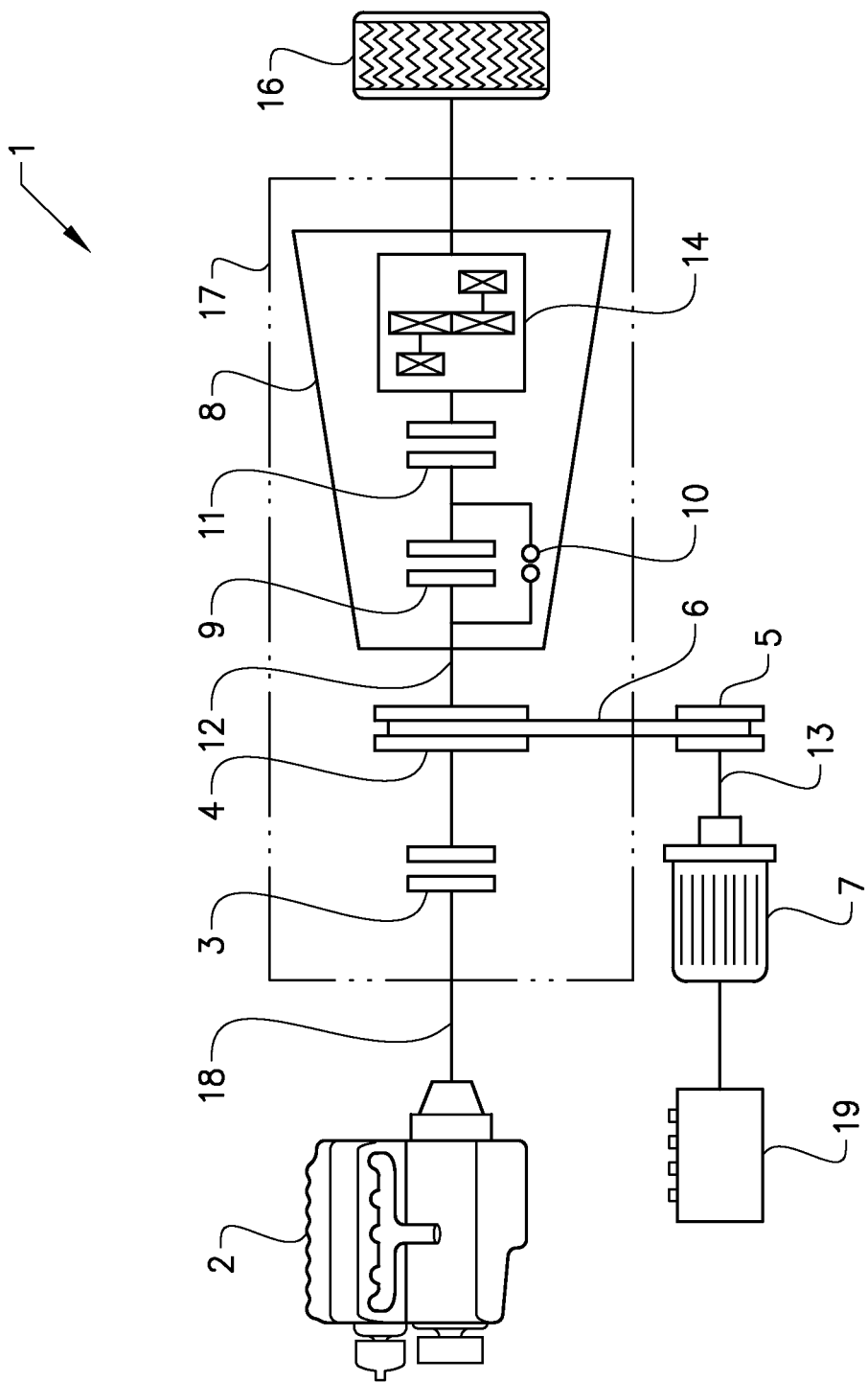
FIG. 1 shows a schematic system for starting an internal combustion engine of a hybrid vehicle according to the invention.
Figure 2:
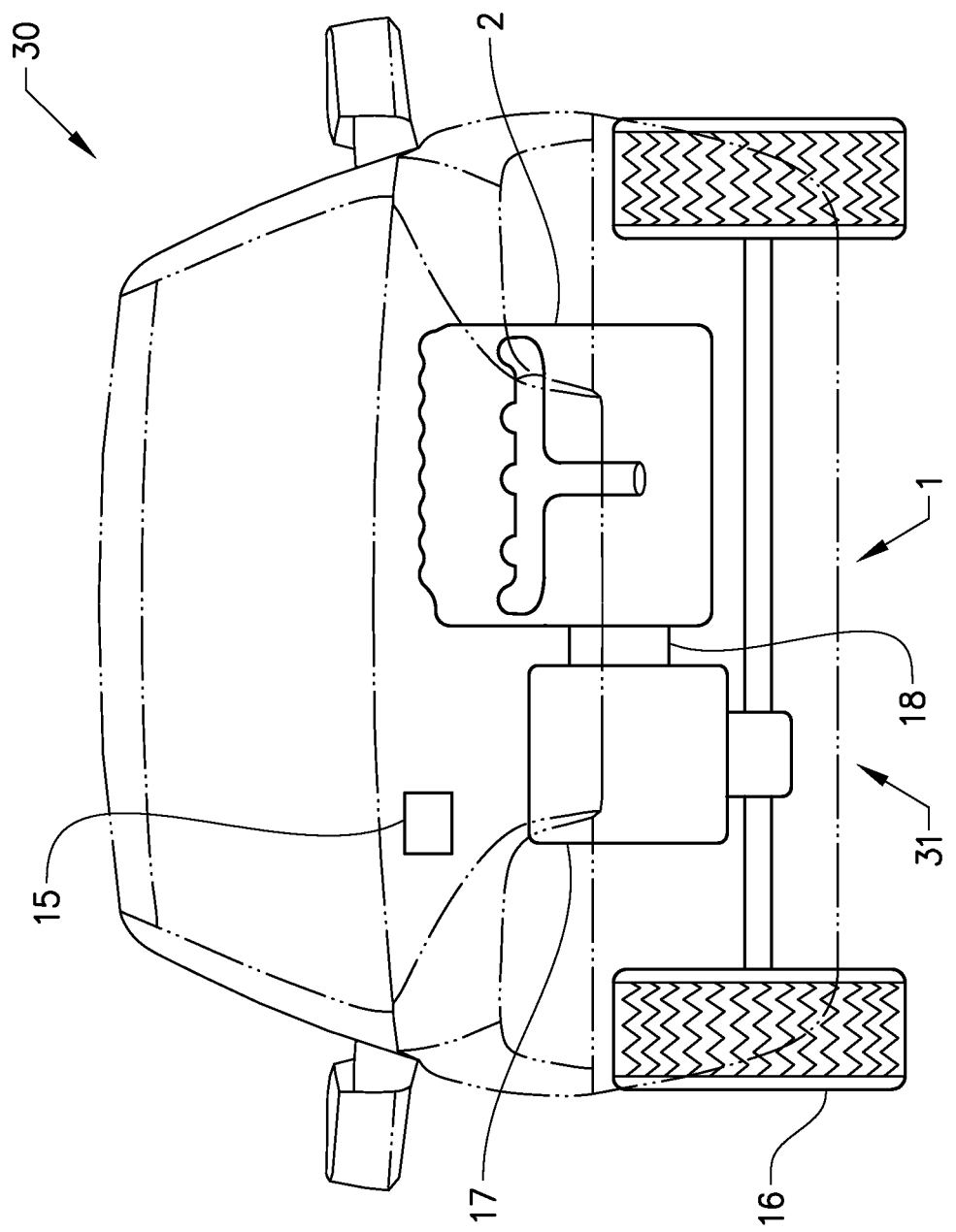
FIG. 2 shows a schematic hybrid vehicle comprising a system for starting an internal combustion engine according to the invention.

FIG. 1 schematically shows a system 1 for starting an internal combustion engine 2 of a hybrid vehicle 30 (shown in FIG. 2). The hybrid vehicle 30 comprises a driveline 31 (shown in FIG. 2) comprising the internal combustion engine 2, a transmission unit 17 connected to the internal combustion engine via a drive shaft 18. The internal combustion engine 2 is adapted to rotate the drive shaft 18 to provide torque to the at least one of the driving wheels 16 of the hybrid vehicle 30 via the transmission unit 17. The transmission unit 17 comprises a first clutch 3 that is connecting the internal combustion engine 2 to an input shaft 12 of a gearbox 8. The input shaft 12 is connected to a torque converter 10 of the gearbox 8. The torque converter is provided with a lock-up clutch 9 which can be used to lock the torque converter 10 when the rotational speed of the input shaft and the second clutch should be the same. At e.g. low engine speeds, the lock-up clutch is preferably disengaged, i.e. open. The torque converter 10 is connected to a second clutch 11, which in turn connects the torque converter 10 to the at least one driving wheel 16 through a transmission 14. The transmission 14 is provided with a plurality of cog wheels adapted to set the rotational ratio between the second clutch and the driving wheel. The input shaft is further connected to an electric machine 7 with a first pulley 4 mounted on the input shaft 12 and a second pulley 5 mounted on the electric machine 7. A flexible driving member 6 connects the first pulley to the second pulley. The electric machine 7 may also be an inline electric machine mounted on the input shaft 12.

The hybrid vehicle 30 is using a combination of the internal combustion engine 2 and the electric machine 7 as power sources to provide torque to at least one of the driving wheels 16 of the vehicle 30. The internal combustion engine 2 can be operated intermittently to provide power to the hybrid vehicle's driveline 31 when needed depending on the driving conditions. In for example low speed driving situations, the hybrid vehicle 30 may be operated by only using the electric machine 7 and when more power is needed, the internal combustion engine 2 supplies additional power to the driveline or supplies all power to the driveline, for example when driving at higher speeds. Both the internal combustion engine 2 and the electric machine 7 could drive one or more driving wheels 16 through the hybrid vehicle's transmission unit 17.

The hybrid vehicle 30 uses in this example a 48 V electrical system with an electric energy storage device 19. The electric energy storage device 19 may for example be a system of lithium-ion battery cells providing electric energy to the electric machine 7 and other electrical components of the hybrid vehicle 1. Any type of suitable battery cell may be used as electric energy storage device, either separately or in combination. Since the hybrid vehicle 30 is adapted to be used in a fully electrical mode only for short distances, the battery may be rather limited in size and power. The electric machine 7 is preferably adapted to function as both an electric motor and a generator. The electric machine supplies power to the hybrid vehicle 30 in the electrical driving mode. When the internal combustion engine 2 provides power to the hybrid vehicle 30, the electric machine may function as a generator for charging the electric energy storage device 19. The electric machine may also be used for recovering braking energy and the recovered braking energy may be used for charging the electric energy storage device 19. The electric energy storage device and the electrical system may also have other voltages.

The input shaft 12 is provided with a first pulley 4 and the electric machine 7 is provided with a second pulley 5. The electric machine 7 is connected to the input shaft 12 via a flexible driving member 6. The flexible driving member 6 may e.g. be a drive belt with or without teeth that transfers torque to or from the electric machine 7. Alternatively, the first and second pulley may also be provided with teeth adapted to interact with a chain instead of a belt. A shaft 13 extends from the electric machine 7 to the second pulley 5. The second pulley 5 has in the shown example a smaller radius than the first pulley 4 such that a fixed torque ratio is established between the second pulley 5 and the first pulley 4. The torque ratio may differ depending e.g. on the type of hybrid vehicle and the torque delivered by the electric machine 7, but is typically ranging between 1:2 and 1:4, to establish sufficient power needed to drive the vehicle 30 and to start the engine. In this way a relatively small and compact electric machine can be used.

The electric machine 7 is through the arrangement with the flexible driving member 6 arranged in an offset relationship to the input shaft 12, instead of being connected in line with the input shaft 12. This offset arrangement keeps the increase in length of the transmission unit 17 to a minimum, which gives a compact design suitable for modern hybrid vehicles. A further advantage is that the electric machine can easily be exchanged to other types of electric machines without affecting the engine-transmission installation, e.g. when a more powerful electric machine is required for a larger engine or an electric machine with another voltage is to be used. The electric machine can also easily be replaced if it is worn or broken, and the torque ratio can easily be altered. The electric machine may also be an integrated starter generator (ISG) arranged on the input shaft 12.

The second clutch 11 is connecting the torque converter 10 to the transmission 14. The second clutch 11 is preferably of a traditional clutch type as used for either manual or automatic transmissions. The transmission 14 delivers torque to at least one of the driving wheels 16 of the hybrid vehicle 1. The second clutch 11 is arranged to engage the transmission 14 in a closed state when delivering torque from the internal combustion engine 2 or the electric machine 7 through the torque converter 10 to the at least one driving wheel 16, and to disengage the transmission 14 in an open state in relation to the input shaft 12 when not delivering torque to the at least one driving wheel 16. Between the open state and closed state of the second clutch 11 there is a slip region. The slip occurs when the second clutch 11 is shifting from being engaged to being disengaged, or vice versa. In reality this means that the part of the second clutch 11 connected to the torque converter 10 has a different rotational speed compared to the part of the second clutch 11 being connected to the transmission. This difference in rotational speed is called slip and can be used to maintain a determined torque transfer level between the input shaft 12 through the torque converter 10 and the transmission 14. The slip could be varied depending on the torque level needed. When the second clutch 11 is fully engaged there is no slip and in the same way there is no slip when the second clutch 11 is fully disengaged.

Before starting the internal combustion engine 2, the hybrid vehicle is powered by the electric machine 7 and the first clutch 3 is open, i.e. disengaged. When the internal combustion engine is to be started, a start signal is issued by a control unit of the vehicle. A start signal may be issued e.g. when the SoC of the 48 V battery is low, or when the vehicle is accelerating and requires more power than the electric machine can deliver. Especially when the vehicle is accelerating, it is important that the start procedure of the internal combustion engine is short, such that the driver does not notice a dip in the acceleration.

When the start signal has been issued, the second clutch 11 is disengaged to a predetermined torque level such that there is a slip in the second clutch. The slip in the second clutch will allow the same torque to be transferred to the transmission as before the start procedure. When the second clutch is set to the predetermined torque level, the lock-up clutch 9 is engaged. By engaging the lock-up clutch, the angular momentum of the torque converter can be used to initiate a start of the internal combustion engine. When the lock-up clutch is fully engaged, the first clutch is engaged. This will transfer the angular momentum of the torque converter to the internal combustion engine and this will in turn bring the internal combustion engine to a first rotational speed. The first rotational speed depends on the type of engine, but a rotational speed of at least 300 rpm and preferably 400 rpm is desirable.

When the internal combustion engine has reached the first rotational speed, the first clutch is disengaged again. The first rotational speed is sufficient to allow the start of the internal combustion engine by injecting fuel and igniting the fuel. The rotational speed of the internal combustion engine will now rise quickly since the internal combustion engine is running free with no load. When the internal combustion engine has reached a second rotational speed, the first clutch is engaged again such that the internal combustion engine can power the hybrid vehicle. The second rotational speed is preferably the same speed as the second clutch, such that there is no speed difference between the internal combustion engine and the input shaft to the transmission when the first clutch is engaged. When the first clutch has been engaged, the second clutch can also be fully engaged in order to avoid slip in the driveline.

In the described example, the electric machine is powering the vehicle with all available power, and the electric machine cannot deliver any additional torque to the start procedure of the internal combustion engine. In a further example, there is a power reserve in the electrical system. In this example, the electric machine will help to start the internal combustion engine. When the start signal is issued, the electric machine is set to deliver maximum torque. The second clutch is at the same time set to a predefined torque level. The additional torque delivered by the electric machine will accelerate the input shaft 12 and the torque converter 10 to a higher rotational speed, depending on the driving conditions. When a predetermined rotational speed of the torque converter is reached, the lock-up clutch is engaged. The angular momentum of the torque converter can now be used to initiate a start of the internal combustion engine as described above. When the lock-up clutch is fully engaged, the first clutch is engaged. This will transfer the angular momentum of the torque converter to the internal combustion engine and this will in turn bring the internal combustion engine to a first rotational speed. The first rotational speed depends on the type of engine, but a rotational speed of at least 300 rpm and preferably 400 rpm is desirable.

The use of the electric machine to supply additional torque to the torque converter can be used to start the internal combustion engine even faster by supplying a higher angular momentum to the internal combustion engine. The electric machine can also be used to supply additional torque to the torque converter when the torque of the torque converter itself is not enough to bring the internal combustion engine to the first rotational speed, i.e. a speed from which the ignition system of the internal combustion engine can start the engine. In this way, the electric machine is set to add the missing torque.

In one example, the torque of the torque converter itself can bring the internal combustion engine to a rotational speed of 300 rpm, but a rotational speed of 400 rpm is required to start the internal combustion engine. The electric machine can in this case be set to deliver additional torque such that the internal combustion engine can be brought to a rotational speed of 400 rpm.

When there is reserve power in the electrical system, the electric machine can also help to start the internal combustion engine faster. One way is to supply additional torque to the torque converter as described above. Another way is to supply additional torque to the internal combustion engine during the ignition start procedure. When the first clutch has been engaged and the angular momentum of the torque converter has been transferred to the internal combustion engine, the first clutch is not fully disengaged. Instead, the first clutch is set to a torque value that corresponds to the additional torque delivered by the electric machine. The additional torque of the electric machine will thus be transferred to the internal combustion engine, and this will help the internal combustion engine to reach the second rotational speed faster. When the second rotational speed is reached, the first clutch is fully engaged.

In an example, the electric machine 7 may have the capacity to deliver a maximum torque of 150 Nm to the hybrid vehicle 30. In a specific situation in an electrical driving mode, the electric machine 7 delivers 100 Nm for driving the hybrid vehicle 1. If the driving situation changes and there is for example a need to deliver 180 Nm to the hybrid vehicle 30, the electric machine 7 will not have enough power to deliver the desired torque level and the internal combustion engine 2 needs to be started in order to deliver the torque required. To start the internal combustion engine, the first clutch 3 is disengaged such that the input shaft and the torque converter are disconnected from the internal combustion engine. The second clutch 11 is disengaged to a predetermined torque level, for example 100 Nm, and is set so that there is a slip to maintain the 100 Nm torque level until the input shaft and the torque converter are accelerated to start the internal combustion engine 2. When the first clutch 3 is disengaged and the second clutch 11 is disengaged to the predetermined torque level of 100 Nm, the input shaft and the torque converter are accelerated with the electric machine 7 to a predetermined rotational speed. To accelerate the input shaft and the torque converter, the remaining available torque level of the electric machine 7 of 50 Nm may be used so that the maximum torque level of 150 Nm of the electric machine is utilized. When the input shaft and the torque converter have reached the desired rotational speed, the first clutch 3 is engaged to initiate the start procedure of the internal combustion engine 2 with the energy stored in the input shaft, the torque converter and the auxiliary drive source. When the first rotational speed of the internal combustion engine 2 is reached, the first clutch is disengaged.

The mass and rotational speed of the input shaft and the torque converter can be varied depending on the type of internal combustion engine used in the hybrid vehicle and the driving situation, but typically the torque required to start the internal combustion engine ranges between 50-200 Nm. The time period needed to accelerate the input shaft and the torque converter to the desired rotational speed is very short and typically ranging between 200 ms and 500 ms. The rotational speed of the input shaft and the torque converter may range between 50 rpm and 1000 rpm above the first rotational speed of the internal combustion engine and the inertia of the input shaft and the torque converter may range between 0.05 $kgm^2$ and 0.40 $kgm^2$.

In this example, the electric machine delivers 100 Nm to the hybrid vehicle 30 during acceleration of the input shaft and the torque converter and 50 Nm to the acceleration of the input shaft and the torque converter. Thus, the maximum torque level of 150 Nm is delivered from the electric machine 7. Once the internal combustion engine 2 has started, the power from the electric machine 7 can be decreased depending on the driving situation or even be set to deliver no torque at all so that the hybrid vehicle 30 is powered only by the internal combustion engine 2. If needed, the electric machine may be used for charging the electric energy storage device with power from the internal combustion engine 2 or from recovering braking energy.

When the electric machine is used to deliver additional torque to the torque converter, all rotating parts arranged between the first clutch 3 and the second clutch 11 are comprised in the rotational mass storing torque. This includes the electric machine itself, the first pulley, the second pulley, the flexible driving member, the parts of the torque converter, the internal shaft between the torque converter and the second clutch.

When engaging the lock-up clutch or when accelerating the mass of the input shaft and the torque converter, the internal combustion engine 2 is disconnected from the input shaft via the first clutch 3. The first clutch 3 is arranged to engage the input shaft in a closed state and to disengage the input shaft in an open state in relation to the internal combustion engine 2. The first clutch 3 could for example be a traditional friction clutch arranged between the input shaft and the internal combustion engine 2.

The start of the internal combustion engine 2 is initiated by engaging the first clutch 3 such that the angular momentum of the torque converter is transferred from the input shaft 12 to the internal combustion engine via the drive shaft 18. When the internal combustion engine 2 has started and is delivering power to the hybrid vehicle 30, the first clutch 3 is in its closed state and connecting the input shaft 12 to the internal combustion engine 2. When the internal combustion engine 2 is shut down, the first clutch 3 disengages the input shaft from the internal combustion engine 2 so that the first clutch is in its open state. In this way the internal combustion engine 2 is disconnected from the input shaft 12 and other parts of the transmission unit 17 when only the electric machine 7 is delivering power to the hybrid vehicle 1.

The system 1 for starting the internal combustion engine 2 is adapted to be used in the hybrid vehicle 30. The hybrid vehicle 30 is provided with a control unit 15, which is adapted to control the system and method for starting the internal combustion engine. The control unit 15 is connected to the control system of the hybrid vehicle 30, which for example controls the internal combustion engine 2 and other parts of the hybrid vehicle 30. The method steps are preferably performed by a computer program and a computer program product contained and run in the electronic control unit of the vehicle.

FIG. 2 schematically shows a hybrid vehicle 30 in form of a car with a schematic driveline 31. The driveline comprises an internal combustion engine 2, a transmission unit 17 connected to the internal combustion engine via a drive shaft 18, as shown in FIG. 1. The internal combustion engine may provide torque to at least one driving wheel 16 of the hybrid vehicle 30 via the transmission unit 17.

Figure 3:
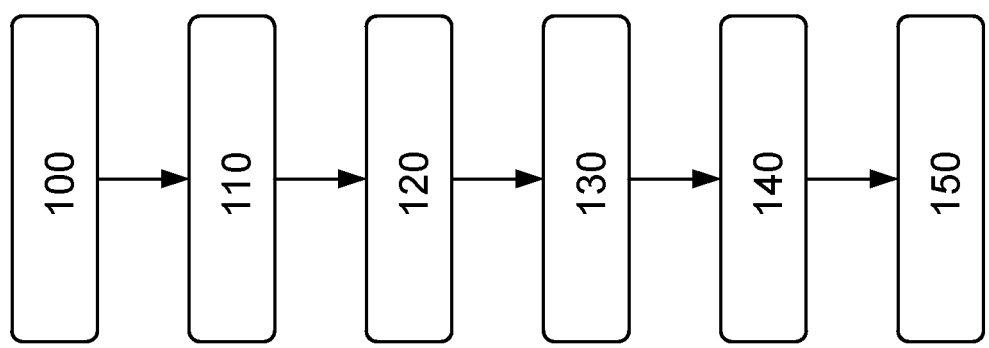
FIG. 3 shows a schematic flow chart of a method for starting an internal combustion engine of a hybrid vehicle according to the invention.

FIG. 3 shows a flow chart of the method for starting an internal combustion engine of a hybrid vehicle. In the method, the hybrid vehicle is powered by the electric machine 7 and the first clutch 3 is open.

In step 100, the second clutch 11 is disengaged to a predetermined torque level such that there is a slip in the second clutch. In this way, the vehicle will continue with the same speed and the driver will not notice a speed change.

In step 110, the lock-up clutch 9 of the torque converter 10 is engaged. By engaging the lock-up clutch quickly, the complete angular momentum of the torque converter can be used to initiate the start procedure of the internal combustion engine.

In step 120, the first clutch 3 is engaged to bring the internal combustion engine to a first rotational speed high.

In step 130, the first clutch 3 is disengaged when the internal combustion engine has reached the first rotational speed.

In step 140, the internal combustion engine is started by injecting fuel and igniting the fuel. This is a normal start procedure of the internal combustion engine which can be performed when the rotational speed of the internal combustion engine is higher than a specified rotational speed, in this case higher than the first rotational speed.

In step 150, the first clutch 3 is engaged when the internal combustion engine 2 has started and the rotational speed of the internal combustion engine equals a second rotational speed. The second rotational speed preferably corresponds to the rotational speed of the input shaft 12 of the transmission unit, such that there will be no or limited slip in the second clutch 11. The internal combustion engine 2 and the second clutch are thus preferably synchronized when the first clutch 3 is engaged.

The invention is not to be regarded as being limited to the embodiments described above, a number of additional variants and modifications being possible within the scope of the subsequent patent claims.

The invention claimed is:

1. A method for starting an internal combustion engine of a hybrid vehicle when the hybrid vehicle is powered by an electric machine, where the internal combustion engine is adapted to rotate a drive shaft providing torque to at least one driving wheel of the hybrid vehicle via a transmission unit, where the transmission unit comprises a first clutch connecting the internal combustion engine to an input shaft of a gearbox, where the input shaft is connected to a torque converter provided with a lock-up clutch, where the torque converter is connected to a second clutch connecting the torque converter to the at least one driving wheel through a transmission, where the input shaft further is connected to the electric machine and where the first clutch is open, the method comprising the steps of:

disengaging the second clutch to a predetermined torque level such that there is a slip in the second clutch;

engaging the lock-up clutch;

engaging the first clutch to bring the internal combustion engine to a first rotational speed;

disengaging the first clutch when the internal combustion engine has reached the first rotational speed;

starting the internal combustion engine by injecting fuel and igniting the fuel, and engaging the first clutch when the internal combustion engine has started and rotates with a second rotational speed.

2. The method of claim 1, comprising the additional step of delivering an additional torque to the torque converter by the electric machine before the lock-up clutch is engaged.

3. The method of claim 2, comprising the additional step of disengaging the first clutch to a torque level which corresponds to the additional torque delivered by the electric machine when the internal combustion engine has reached the first rotational speed.

4. The method of claim 1, wherein the first rotational speed of the internal combustion engine is ranging between 300 rpm and 500 rpm.

5. The method of claim 1, wherein the first rotational speed of the internal combustion engine is 400 rpm.

6. The method of claim 1, wherein the second rotational speed of the internal combustion engine is above 800 rpm.

7. The method of claim 1, wherein the second rotational speed of the internal combustion engine corresponds to the rotational speed of the second clutch.

8. The method of claim 1, wherein the predetermined torque level of the second clutch is ranging between 30 Nm and 300 Nm.

9. The method of claim 1, wherein the method further comprises the step that the second clutch is engaged to a fully engaged state to deliver torque to the at least one driving wheel of the hybrid vehicle when the internal combustion engine has started.

10. A computer program comprising program code means for performing all the steps of claim 1 when said program is run on a computer.

11. A computer program product comprising program code means stored on a computer readable medium for performing the steps of claim 1 when said program product is run on a computer.

12. A system for starting an internal combustion engine of a hybrid vehicle when the hybrid vehicle is powered by an electric machine, where the system comprises an internal combustion engine, an electric machine, and a transmission unit, where the transmission unit comprises a gearbox, where the gear box comprises a torque converter provided with a lock-up clutch, a second clutch and a transmission, where the internal combustion engine is adapted to rotate a drive shaft providing torque to at least one driving wheel of the hybrid vehicle via the transmission unit, where the first clutch connects the internal combustion engine to the input shaft of the gearbox, where the input shaft is connected to the torque converter, where the torque converter is connected to the second clutch connecting the torque converter to the at least one driving wheel through the transmission, where the input shaft further is connected to the electric machine, wherein the lock-up clutch is adapted to be engaged after the second clutch has been disengaged to a predetermined torque level such that there is a slip in the second clutch, that the internal combustion engine is adapted to be brought to a first rotational speed by the angular momentum stored in the torque converter by engaging the first clutch, and that the first clutch is adapted to be disengaged until the internal combustion engine has started and reached a second rotational speed.

13. The system of claim 12, wherein the first clutch is adapted to be engaged when the internal combustion engine has reached the second rotational speed.

14. A hybrid vehicle comprising the system of claim 12.

* * * * *